US012567038B2

(12) United States Patent
Connaughton et al.

(10) Patent No.: US 12,567,038 B2
(45) Date of Patent: Mar. 3, 2026

(54) MULTI-MODAL ARTIFICIAL INTELLIGENCE PLATFORM FOR BUILDING CONSTRUCTION

(71) Applicant: X Development LLC, Mountain View, CA (US)

(72) Inventors: Spencer James Connaughton, New York, NY (US); Adrian James Walker, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/758,655

(22) Filed: Jun. 28, 2024

(65) Prior Publication Data

US 2025/0005531 A1      Jan. 2, 2025

Related U.S. Application Data

(60) Provisional application No. 63/511,087, filed on Jun. 29, 2023.

(51) Int. Cl.
G06Q 10/10       (2023.01)
G06Q 50/08       (2012.01)

(52) U.S. Cl.
CPC ........... G06Q 10/103 (2013.01); G06Q 50/08 (2013.01)

(58) Field of Classification Search
None
See application file for complete search history.

(56) References Cited

U.S. PATENT DOCUMENTS

| | | | | |
|---|---|---|---|---|
| 12,165,229 B1* | 12/2024 | Carroll | .................. | G06F 18/214 |
| 2014/0278280 A1* | 9/2014 | Pardo-Fernandez | .... | G06F 30/13 |
| | | | | 703/1 |
| 2019/0220759 A1* | 7/2019 | Tierney | .................. | G06T 17/05 |
| 2021/0365602 A1* | 11/2021 | Gifford | .................. | G06T 17/00 |
| 2022/0108043 A1* | 4/2022 | Yang | ..................... | G06N 3/094 |
| 2023/0196486 A1* | 6/2023 | Srinivasan | ........... | G06Q 30/018 |
| | | | | 705/315 |

OTHER PUBLICATIONS

International Search Report and Written Opinion in International Appln. No. PCT/US2024/035966, dated Oct. 23, 2024, 17 pages.

\* cited by examiner

*Primary Examiner* — Ari Shahabi

(74) *Attorney, Agent, or Firm* — Fish & Richardson P.C.

(57) ABSTRACT

Methods, systems, and apparatus, including computer programs encoded on computer-storage media, for a multi-modal artificial intelligence platform for building construction. The multi-model artificial intelligence platform includes various engines that perform various computer-implemented methods. The various engines include a site selector artificial intelligence (AI) engine, a geospatial database, a site compliance analyzer AI engine, a masterplan generator AI engine, a compliance analyzer AI engine, an aesthetic generator AI engine, a schematic generator AI engine, a construction plan generator AI engine, a project timeline generator AI engine, a compliance application generator AI engine, and a financial model generator AI engine. Respective AI engines collaboratively cooperate for end-to-end AI-driven building construction design and development.

20 Claims, 4 Drawing Sheets

200

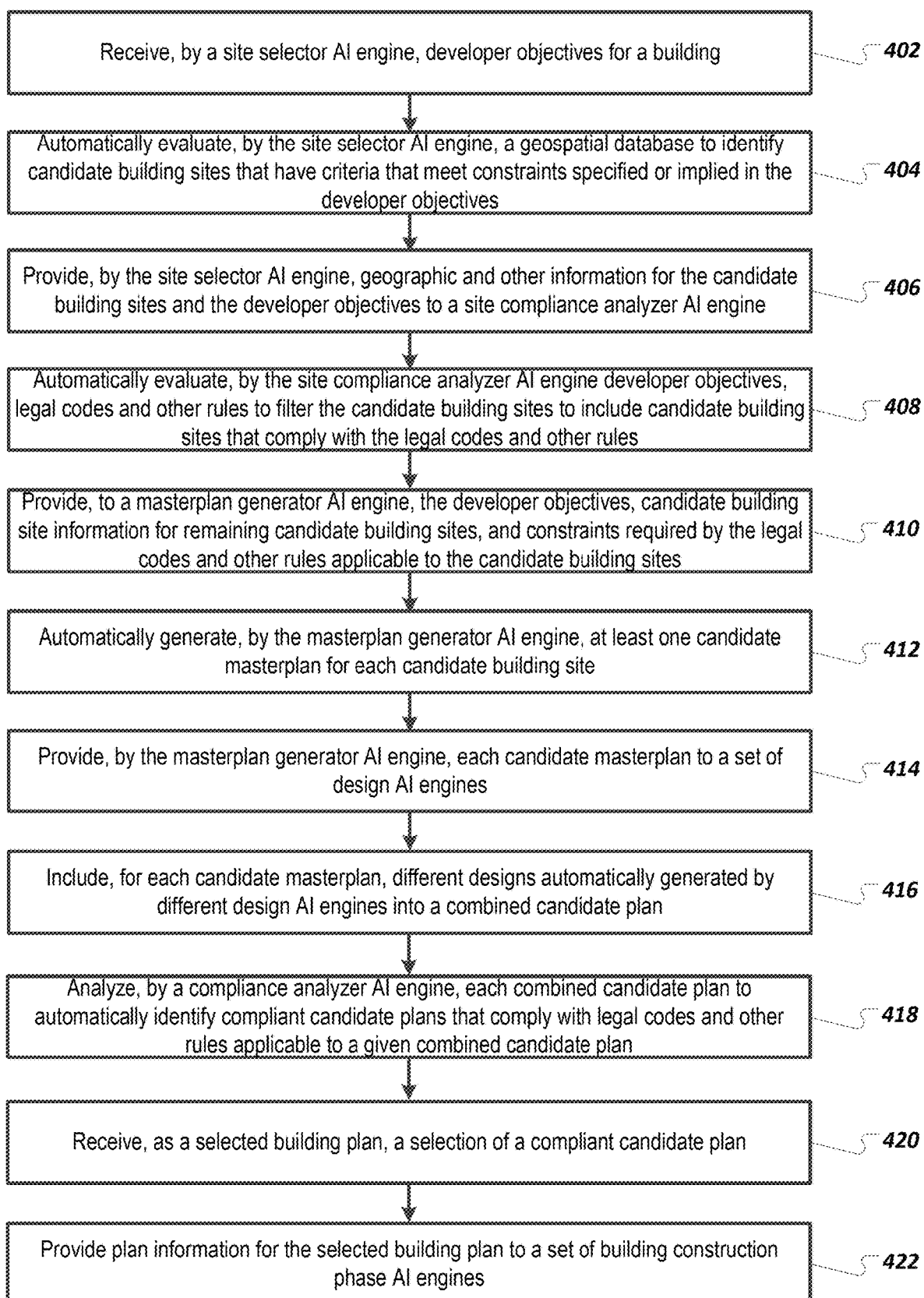

Receive, by a site selector AI engine, developer objectives for a building — 402

Automatically evaluate, by the site selector AI engine, a geospatial database to identify candidate building sites that have criteria that meet constraints specified or implied in the developer objectives — 404

Provide, by the site selector AI engine, geographic and other information for the candidate building sites and the developer objectives to a site compliance analyzer AI engine — 406

Automatically evaluate, by the site compliance analyzer AI engine developer objectives, legal codes and other rules to filter the candidate building sites to include candidate building sites that comply with the legal codes and other rules — 408

Provide, to a masterplan generator AI engine, the developer objectives, candidate building site information for remaining candidate building sites, and constraints required by the legal codes and other rules applicable to the candidate building sites — 410

Automatically generate, by the masterplan generator AI engine, at least one candidate masterplan for each candidate building site — 412

Provide, by the masterplan generator AI engine, each candidate masterplan to a set of design AI engines — 414

Include, for each candidate masterplan, different designs automatically generated by different design AI engines into a combined candidate plan — 416

Analyze, by a compliance analyzer AI engine, each combined candidate plan to automatically identify compliant candidate plans that comply with legal codes and other rules applicable to a given combined candidate plan — 418

Receive, as a selected building plan, a selection of a compliant candidate plan — 420

Provide plan information for the selected building plan to a set of building construction phase AI engines — 422

FIG. 4

MULTI-MODAL ARTIFICIAL INTELLIGENCE PLATFORM FOR BUILDING CONSTRUCTION

CROSS-REFERENCE TO RELATED APPLICATION

This application claims the benefit of U.S. Provisional Application No. 63/511,087 filed Jun. 29, 2023, the disclosure of which is incorporated herein in its entirety.

FIELD

This specification generally relates to artificial intelligence in building construction.

BACKGROUND

Building construction can involve numerous phases. For instance, a construction project can involve phases such as requirements gathering, site selection, design, and construction.

SUMMARY

A multi-modal generative AI (Artificial Intelligence) platform that includes multiple AI engines can increase a scale and attainability of creating sustainable buildings. The multi-model generative AI platform can use various AI and machine learning (ML) approaches, including Large Language Model (LLM) AI, computer vision, and reinforcement learning. Additionally, respective AI engines of the platform can use inverse design in different areas of building development and construction by automatically identifying suitable building sites, plans, designs, etc. based on specified objectives and applicable regulations.

The multi-modal generative AI platform can solve problems inherent in the building construction problem domain, such as land shortage with respect to desired zoning, regulatory compliance accounting for substantial portions of construction time and cost, and inefficiencies that can occur due to miscommunication, bad data, or efforts spent on one-off projects. The comprehensive multi-model AI platform can create numerous efficiencies as compared to existing fragmented solutions that only address singular aspects of construction. The multi-modal generative AI platform can substantially increase real estate development efficiency across all phases, including pre-development such as site selection and diligence, design, permitting, capital allocation/financing phases, and construction. The multi-modal generative AI platform can leverage various AI/ML approaches and innovations to collapse what otherwise includes months of research, planning, development, engineering, and financing activities. Other technical benefits and advantages are discussed in more detail below.

One innovative aspect of the subject matter described in this specification is embodied in a method that includes: receiving, by a site selector artificial intelligence (AI) engine, developer objectives for a building; automatically evaluating, by the site selector AI engine, a geospatial database to identify candidate building sites that have criteria that meet constraints specified or implied in the developer objectives; providing, by the site selector AI engine, geographic and other information for the candidate building sites and the developer objectives to a site compliance analyzer AI engine; automatically evaluating, by the site compliance analyzer AI engine and for each candidate building site, the developer objectives and legal codes and other rules of a jurisdiction application to a location of the candidate building site to filter the candidate building sites to include candidate building sites that comply with the legal codes and other rules; providing, by the site compliance analyzer AI engine and to a masterplan generator AI engine, the developer objectives and, for each remaining candidate building site, candidate building site information for the candidate building site including constraints required by the legal codes and other rules applicable to the candidate building site; automatically generating, by the masterplan generator AI engine, at least one candidate masterplan for each candidate building site; providing, by the masterplan generator AI engine, each candidate masterplan to a set of design AI engines; including, for each candidate masterplan and into a combined candidate plan, different designs automatically generated by different design AI engines; analyzing, by a compliance analyzer AI engine, each combined candidate plan to automatically identify compliant candidate plans that comply with legal codes and other rules applicable to a given combined candidate plan; receiving, as a selected building plan, a selection of a compliant candidate plan; and providing plan information for the selected building plan to a set of building construction phase AI engines.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. The compliance application generator AI engine can automatically generate completed compliance forms specific to a jurisdiction corresponding to the selected building plan and automatically provide the completed compliance forms to an appropriate entity in the jurisdiction corresponding to the selected building plan. An approval engine can receive construction approval for the selected building plan from the appropriate entity and automatically provide construction approval information for the selected building plan to the general contractor. Combined plan information for the selected building plan can be provided to a financial model generator AI engine. The financial model generator AI engine can automatically generate, based on combined plan information for the selected building plan, a financial model for the selected building plan that includes a standardized projected balance sheet, a projected income statement, and a projected cash flow statement. The compliance analyzer AI engine can identify at least one non-compliant combined candidate plan, such as a first non-compliant candidate plan that can be modified to become compliant by including one or more new constraints. The compliance analyzer AI engine can automatically provide the one or more new constraints to at least one of the masterplan generator AI engine or one or more design AI engines for a next AI iteration for modifying non-compliant combined candidate plan to be compliant.

The details of one or more implementations are set forth in the accompanying drawings and the description, below.

Other potential features and advantages of the disclosure will be apparent from the description and drawings, and from the claims.

BRIEF DESCRIPTION OF THE DRAWINGS

FIG. 4 is a flow diagram for an example process for using artificial intelligence in building construction.

DETAILED DESCRIPTION

Figure 1:
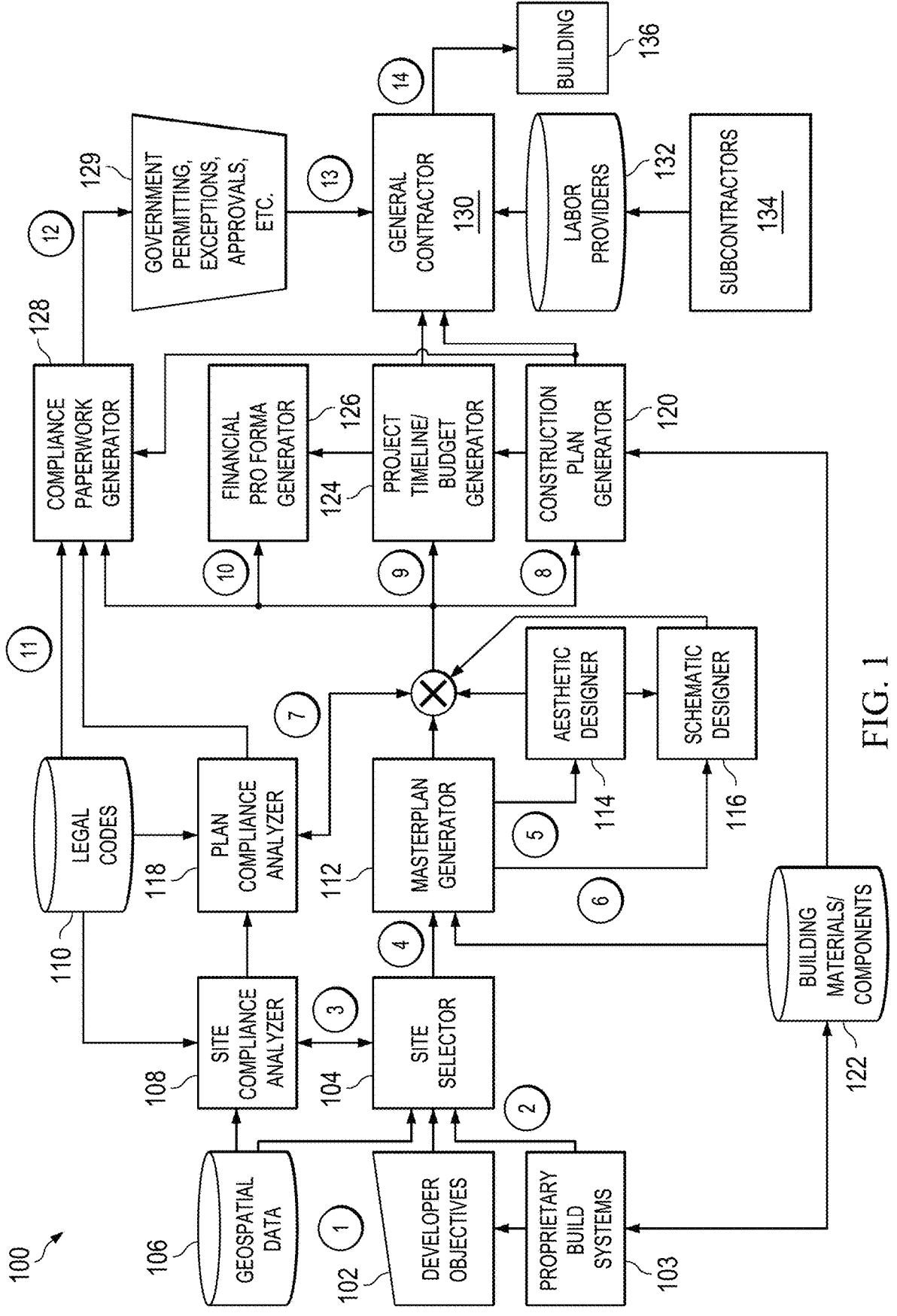
FIG. 1 illustrates an example system for using AI in building construction.

In general, the disclosure relates to artificial intelligence in building construction. Building construction is a complicated process that involves numerous sub-processes and stages, including definition of developer objectives, consideration of build systems, site selection, site compliance analysis, masterplan generation, consideration of building materials and components, aesthetic design, schematic design, plan compliance analysis, financial tasks, project timeline management, construction plan generation, compliance paperwork, permitting processes, and actual construction with a general contractor and various subcontractors. Each stage may involve introduction of constraints that must be considered during design and construction. Additionally, traditional building processes involve interactions between numerous entities and individuals, including designers, architects, lawyers, inspectors, engineers, government officials, builders, and others.

Each entity or individual may be involved in identifying or introducing constraints and/or preferences for one or more stages. Often, each individual or entity spends a substantial amount of time on their own specific task, and then undergoes a time-consuming interaction with other individual(s) or entities to hand off work to a next stage. However, the next individual or entity may suggest or insist on rework before a subsequent stage can be completed. Such interaction and iteration in traditional manual approaches can consume substantial time of the construction timeline, and can result in risk of timeline overruns, project cancellation, or an eventual acceptance of a final product that is less than desirable to one or more parties.

As an example, in a site selection stage, a developer may identify a few sites to consider, such as by using broker listings, walking the streets, or viewing aerial maps. The developer may manually cross reference numerous data sources to obtain basic site information for a few sites under consideration. In a design phase, the developer, financial analysts, architects, and engineers may spend months on site design activities, and may meet daily, weekly, etc., to align and integrate work done individually in prior time windows. These multiple meetings may require countless iterations in order to meet the desires and requirements of all parties. Timeline and human resource constraints may result in only a small handful of project designs being meaningfully considered. Additionally, local government regulators and inspectors may spend many hours on review of project designs and interaction with building project personnel. Eventually, a project may be approved. During construction, construction teams may encounter issues from design drawings made by multiple different types of designers that may have incompatibilities that are discovered late in the process at the construction site, which can cause rework and backward movement for the entire process, along with substantial re-coordination, cost, and time expenditure.

To improve upon traditional building approaches, a comprehensive artificial intelligence approach can be applied to building construction, which can automate tasks performed in respective stages along with integration tasks performed between components or entities, resulting in substantially compressed timelines, project consistency, and enablement of an order of magnitude higher number of iterations between components and entities (as compared to traditional approaches), which can result in an order of magnitude higher number of project candidates being considered, which can substantially increase a likelihood of project satisfaction and project completion during a predefined timeline, thereby reducing risks associated with resource expenditure that may occur due to uncompleted or unsatisfactory projects. Moreover, this comprehensive approach allows for coordination between entities, stages, and desired parameters that would not be possible with mere human interactions or coordination.

Each stage can involve specific AI functionality. For example, a site selector AI engine can be trained to recommend candidate parcels based on developer objectives and the developer's proprietary build system (if applicable). For a given city, for example, the site selector can automatically identify sites that are geologically suitable for a particular building type, and in locations desirable to particular demographics. (Of course, the site selector can identify developable parcels on a broader scale-statewide, countrywide, or even worldwide.) A site compliance AI engine can be trained to determine jurisdictions whose rules apply to each candidate parcel identified by the site selector and to automatically analyze which rules apply for each site, and whether developer objectives implemented at the site would comply with them. The site compliance analyzer can return to the site selector: 1) a list of suitable sites that would be in compliance (along with planning and construction rules for being in compliance); 2) a list of unsuitable sites that would not be in compliance; and 3) a list of sites where more information is needed to make a determination, or that require discretionary approvals from local authorities. The site selector can then provide, to a masterplan generator AI engine, information identifying suitable sites, the developer objectives, and any compliance-related constraints. The masterplan generator AI engine can be trained to create candidate masterplans for each suitable site.

The masterplan generator can provide masterplans to both an aesthetic generator and a schematic generator. The aesthetic generator can be trained to produce renderings, descriptions, and bill of materials for aesthetic features of a plan, such as building facades, cladding, accents, landscaping, exterior and interior lighting, and interior concepts. In some implementations, the aesthetic generator can be utilized earlier in the process, whereby aesthetic features are generated earlier, and then plans are generated that fit within the aesthetic design that also meet compliance rules. The schematic generator can use the masterplans and the aesthetic features to generate high-level schematic drawings, such as landscaping diagrams, elevation plans, and floor-plans.

A plan compliance analyzer can receive, as combined plans, candidate masterplans and corresponding aesthetic and schematic design information. The plan compliance analyzer can be trained to automatically determine whether combined plans are in compliance with site-specific and other applicable construction rules. The plan compliance analyzer can determine, for combined plans that are not in compliance, whether there are compliance violations that are irreconcilable based on the developer's objectives or whether the plan can be adjusted to be brought into compliance. The plan compliance analyzer can provide reports for irreconcilable combined plans. For reconcilable combined plans, the plan compliance analyzer can automatically send back information identifying new constraint(s) that would bring the plan into compliance to the masterplan generator and/or the aesthetic or schematic generators, to trigger another iteration.

Combined plans that pass the plan compliance analyzer can be provided to a construction plan generator that can be trained to generate detailed construction plans (e.g., shovel-ready CAD drawings) based on combined plans. The construction plan generator can provide construction plans to a project timeline/budget generator. The project timeline/budget generator can aggregate part counts from construction plans and generate purchase orders for a selected construction plan. The project timeline/budget generator can also generate a project timeline and project task dependency graph for construction from the construction plan. The project timeline/budget generator can provide information to a financial model generator that can be trained to combine building plan information and developer objectives to produce a financial model for the building that can include a standardized projected balance sheet, income statement, and cash flow statement. The construction plan generator can also provide construction plan information to a compliance paperwork generator. The compliance paperwork generator can automatically complete jurisdiction-specific applications and provide completed applications to relevant authorities. Finally, the construction plan generator can provide the construction plan information to a general contractor for building construction.

Although the above descriptions describes stages using cooperating AI engines of a same comprehensive system, in some implementations, outputs of a given AI engine may be provided to users of systems along with or alternatively to outputs provided to a given AI engine. As another example, a given AI engine output may be provided to a third party automated engine or system. As yet another example, although some AI engines may be described as receiving user inputs (e.g., constraints), in some implementations those AI engines may receive automatically-generated or inferred inputs determined using AI search/retrieval augmented generation approaches.

In summary, automatic generation by respective AI engines of building stage deliverables, and automatic communication between components, with inter-component communication and iteration enablement, can result in design and consideration of a number of plans not possible with traditional approaches. Additionally, the AI approach can be used to evaluate and design more candidate plans than before possible regardless of an experience level of developer or other personnel by automatic identification of appropriate constraints at various stages of construction. Accordingly, an exhaustive analysis can be performed for evaluating candidate plans, resulting in lower risk of project failure and a higher probability of project satisfaction as compared to a traditional approach in which a relatively small number of plans are considered. Multi-engine implementation, with communication between engines can result in generation of hundreds of candidate scenarios for building design, with accompanying trade-off analysis for consideration.

FIG. 1 illustrates an example system 100 for using AI in building construction. The system 100 is annotated with phase markers (e.g., circled numbers). Although the phases are numbered to indicate a phase order, some phases may occur in a different order than depicted in FIG. 1. For example, although legal and zoning aspects are shown as being performed in an earlier phase before aesthetic design, in some implementations, some aspects of aesthetic design may occur before legal and zoning considerations (with perhaps some modification of aesthetic design, if applicable). In some cases, some activities may be performed in more than one phase. For example, a set of developer objectives 102 may include some aspects of aesthetic design or preferences and other aesthetic design may occur in a later phase as well.

As shown in FIG. 1, in a first phase, a developer user defines the set of developer objectives 102. The developer objectives 102 can indicate a building type (e.g., multi-family, single-family residential, industrial). The developer objectives can include desired use of certain types of materials (e.g., corresponding to a goal of using sustainable building products). As another example, the developer objectives can also refer to desired use of proprietary build systems 103. The proprietary build systems 103 can include use of modular prefabrication components, for example. The proprietary build systems 103 of the developer may impose constraints such as material availability, minimum or maximum sizing, and/or weather sensitivity, for example. The developer objectives can include other criteria representing other preferences, constraints or objectives, such as a desire that the building be within a certain predefined distance from public transit routes, within a certain distance (e.g., corresponding to a walkable distance) from public schools, etc. In general, the developer objectives 102 can include business, social, and/or geographic objectives related to building construction, such as objectives related to profitability, environmental impact, social impact, appeal to marketing demographics, walkability, geographic location, geographic proximity to amenities.

The developer objectives 102 can be provided to a site selector 104. As appropriate, the site selector 104 can also receive information about parameters and constraints of the proprietary build systems 103 of the developer.

In a second phase, the site selector 104 filters candidate parcels identified from a geospatial data database 106 based on the developer objectives 102, and also by factoring in the parameters and constraints of the developer's proprietary build system(s) 103, if applicable. The geospatial data database 106 is a database of geospatial features and overlays related to building construction processes, and can include, for example, jurisdiction boundaries, land parcel boundaries, navigation data, points-of-interest (including amenities), geological data, existing building geometry, and advanced site imagery. The site selector 104 can identify candidate parcels that can fit a desired building footprint and meet the other developer objectives. The site selector 104 can identify, for example, hundreds or even thousands of candidate parcels for a given geographic area. In prior systems, a developer might identify a much smaller number of candidate parcels (e.g., perhaps several) by performing manual tasks such as inquiring with a broker, reviewing broker listings, walking streets, or manually browsing aerial maps. The site selector 104, in contrast, can automatically identify at least a magnitude higher number of candidate parcels in a timeframe not possible by prior manual approaches. The site selector can identify an entire city's vacant and developable parcels that may be good candidates for the building project, for example, where surveying an entire city would not be feasible for a human developer. As one example, the site selector 104 can identify candidate sites that meet a stated objective of "available parcels that can support building of mixed-use 4-20 unit buildings" (and possibly other constraints).

The site selector 104 transmits candidate parcel geographies to a site compliance analyzer 108. In a third phase, the site compliance analyzer 108 queries the geospatial data database 106 to determine the jurisdictions whose rules apply to each candidate parcel. The site compliance analyzer 108 can then query a legal codes database 110 for rules relevant to the determined jurisdictions. Rules can specify, for example, size constraints for buildings in the jurisdiction or at a particular location. Other rule examples can include how far back from a property line a building must be situated. Other constraints can include use constraints, rules for matching character, and heritage of a neighborhood, etc. In some implementations, the site compliance analyzer 108 can extract estimated zoning rules from zoning code data and use one or more models or engines (e.g., a Large Language Model (LLM) to infer zoning rules from public zoning data, and determine whether candidate sites would be in compliance with applicable zoning rules.

The site compliance analyzer 108 can assess whether the intents expressed in the developer objectives 102 are in compliance with the applicable compliance rules on a per-site basis. The site compliance analyzer 108 may prompt the developer for additional or clarifying information not encompassed by the developer objectives 102 related to the applicable compliance rules. The site compliance analyzer 108 can also prompt the developer for input when the site compliance analyzer 108 cannot automatically determine whether a building that meets the developer objectives 102 would comply with a compliance rule. The site compliance analyzer 108 can provide to the site selector 104 a list of suitable parcels as well as planning and construction rules that apply to them. The site compliance analyzer 108 can also provide to the site selector 104 a list of unsuitable parcels/jurisdictions. The system can display information about suitable and unsuitable parcels to the user.

After the site selector 104 receives information about suitable parcels, the site selector 104 can group one or more of these remaining candidate parcels into candidate sites. The site selector can transmit information about sites, relevant developer objectives 102, and any constraints imposed by the relevant compliance rules identified by the site compliance analyzer 108 to a masterplan generator 112.

In a fourth phase, the masterplan generator 112 creates candidate masterplans for each candidate site. The masterplan generator 112 may prompt the developer for additional information or for preferences related to layout and other features. The masterplan generator 112 can generate candidate masterplans for each of the candidate sites, based, for example, on zoning constraints relevant for the candidate site and on the developer objectives 102. For example, the masterplan generator 112 may receive from the site selector 104, certain rules based on whether the project is new construction, a conversion, part of a planned community initiative that are specific to the project type. The masterplan generator 112 can use the project-type and site-specific rules and other information such as desired or required proprietary build systems, to generate the candidate masterplans. For each masterplan, the masterplan generator 112 can generate plan metrics, such as estimated profitability, walkability, sunlight exposure and environmental impact based on construction processes, building materials, and use. In a similar outcome as for the candidate sites, the number of candidate masterplans that can be generated for evaluation using the system 100 exceeds what a human or team of humans can feasibly accomplish.

The masterplan generator 112 can transmit candidate masterplan information (and relevant constraints from earlier phases) to an aesthetic designer 114. The masterplan generator 112 can also transmit candidate masterplan information to a schematic designer 116.

In a fifth phase, the aesthetic designer 114 can produce renderings, descriptions, and bills-of-materials for the aesthetic features of each candidate masterplan, including building facades, cladding, accents, landscaping, exterior and interior lighting, and interior concepts. The aesthetic designer 114 may prompt the user for guidance on design goals and appearance preferences. The aesthetic designer 114 can automatically generate the renderings, descriptions, and bills-of-materials for the aesthetic features for each candidate masterplan from information in the candidate masterplan and any received design goals or appearance preference inputs. The aesthetic designer can automatically generate a total number of aesthetic plans (e.g., one or multiple aesthetic plans for each candidate masterplan for each candidate site) that would not be possible to be produced by human designers.

Figure 2:
FIG. 2 illustrates an example aesthetic design.

FIG. 2 illustrates an example aesthetic design 200 that may be outputted by the aesthetic designer 114. The aesthetic design 200 illustrates exterior design aspects for a proposed building, including building facade, number of floors, architecture style, landscaping, and other aspects. The aesthetic designer 114 can also create aesthetic designs for interior aspects, such as interior renderings of lobbies, entryways, and other building areas, as views from inside a building.

Referring again to FIG. 1, the aesthetic designer 114 can provide generated aesthetic information to the schematic designer 116. In a sixth phase, the schematic designer 116 can use the candidate masterplan information and information received from the aesthetic designer 114 to generate high-level schematic drawings. The schematic designer 116 can generate schematics such as landscaping diagrams, elevation plans and floorplans. The schematic designer 116 can generate programmatic element layouts including appliance layouts for room types such as kitchens, bathrooms, and utility rooms, and furniture layouts for room types such as offices, bedrooms, living rooms, and dining rooms. The schematic designer 116 can generate detailed designs to fill in details of higher-level design information included in a candidate masterplan. As with other phases, the schematic designer 116 is able to generate schematic designs for each candidate masterplan of each candidate site (e.g., a number of schematic designs not feasible for generation by human designers within a typical project timeline).

Additionally, the schematic designer 116, as well as the masterplan generator 112 and aesthetic designer 114, can perform iterative feedback loops by automatically generating designs, presenting designs to the user, receiving user feedback or input, determining whether current plans meet appropriate constraints and compliance requirements, and generating next designs in a next iteration.

Figure 3:
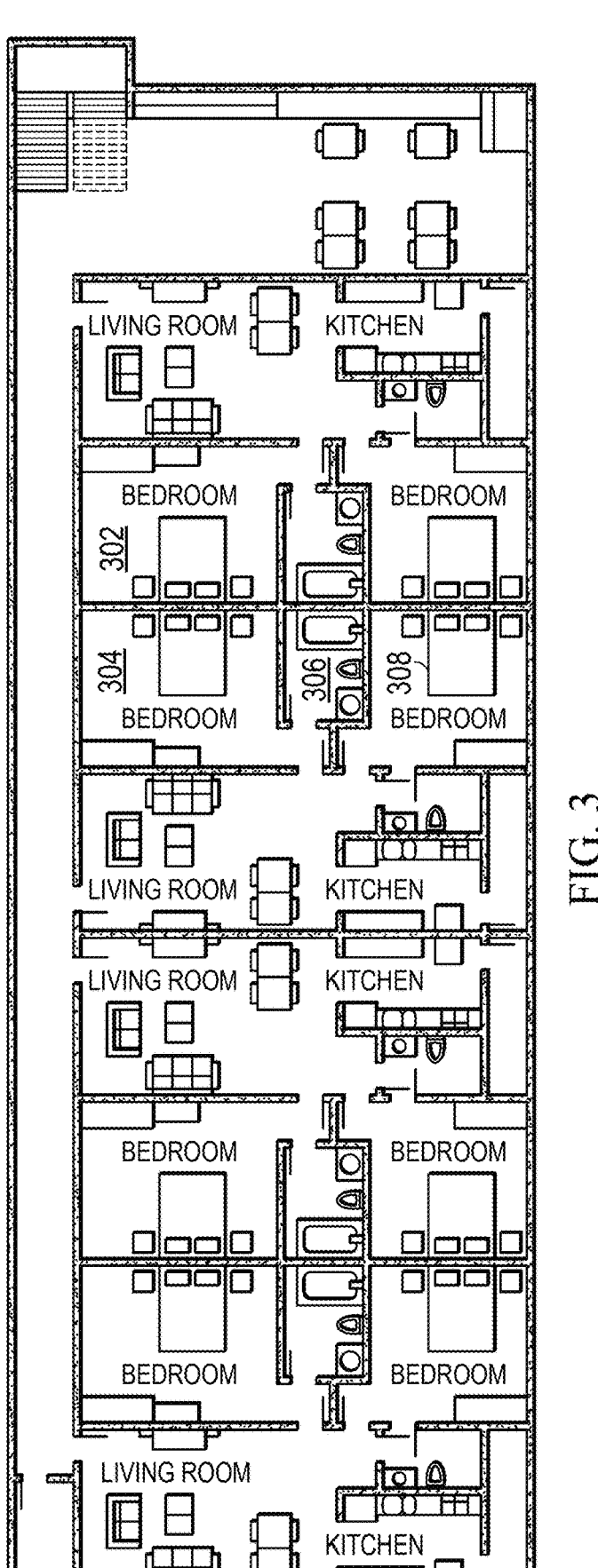
FIG. 3 illustrates an example schematic drawing automatically generated by a schematic designer.

FIG. 3 illustrates an example schematic drawing 300 automatically generated by the schematic designer 116. The schematic drawing 300 illustrates a floorplan for a floor of a candidate building of a candidate masterplan for a candidate site. The floorplan depicts rooms (e.g., a room 302 and a room 304), bathrooms (e.g., a bathroom 306), furniture layout (e.g., furniture 308), and other aspects.

Referring again to FIG. 1, as part of further support for iteration and compliance verification, a plan compliance analyzer 118 can receive candidate masterplans, aesthetic designs, and schematics specifying internal layout information. Such information for a candidate masterplan can be referred to as a combined plan. In a seventh phase, the plan compliance analyzer 118 can also access any site-specific rules and other applicable construction rules. The plan compliance analyzer 118 can analyze the site-specific rules, any relevant information from the legal codes database 110 (e.g., and including any previously-inferred zoning rules identified by the site compliance analyzer 108), the applicable construction rules, and the combined plan information to determine whether or not the combined plans are in compliance. For the plans that are not in compliance, the plan compliance analyzer 118 can determine whether existing plan constraints for a plan create an irreconcilable conflict or whether any plans can be constrained further to be brought into compliance. For non-compliant plans that have irreconcilable conflicts, the plan compliance analyzer 118 can report the violating constraints to the user. For plans that can be further constrained to be brought into compliance, the plan compliance analyzer 118 can transmit the updated constraints to the masterplan generator 112, the aesthetic designer 114, and/or the schematic designer 116 for one or more regeneration runs by those component(s).

As mentioned above, the iteration and redesign support included in the plan compliance analyzer 118 and other components of the system 100 can enable, for example, a significantly higher number of designs being considered, as compared to prior manual-based approaches, resulting in a substantially higher likelihood of successful project completion using less overall resources in an accelerated time frame. Prior approaches may have enabled, for example, consideration of less than ten candidate plans within a defined maximum design phase time period. The use of the system 100, in contrast, can enable evaluation and consideration of hundreds, if not thousands, of candidate plans in the same or less time. With prior approaches, different individuals or entities, such as the developer, financial analysts, construction estimators, architects, structural engineers, sustainability engineers, and others may generally spend months mostly completing work in isolation (e.g., in "silos"), with only occasional interaction with other parties working on the project, such that only a handful of scenarios are meaningfully considered. With the system 100, hundreds of scenarios for design can be considered, with consideration of and analysis of accompanying trade-off decisions, such as affordability, cost drivers, biodiversity, resiliency, on-site energy production, and other factors.

With the system 100, for combined masterplans that pass (or eventually pass) compliance processing performed by the plan compliance analyzer 118, the combined masterplans, designs, and internal layout information can be provided to a construction plan generator 120. In an eighth phase, the construction plan generator 120 can generate, for each combined masterplan, a detailed construction plan based on the combined plans and other design information. The detailed construction plan can include shovel-ready CAD drawings of the construction plans. The construction plans can be detailed enough to be evaluated and tweaked by experienced architects and spell out the requirements for every inch of construction, including the precise, dimensioned designs for building components and their constituent parts drawn from a building materials/components database 122. In some implementations, the site selector 104 can also use information in the building materials/components database 122. For example, the site selector 104 may take into account build system preferences or proprietary build system constraints, and factor in localized availability/costs of acquiring the required materials in the selection process.

The construction plan generator 120 can transmit construction plan information to a project timeline/budget generator 124. In a ninth phase, the project timeline/budget generator 124 can aggregate part counts from the construction plan. The project timeline/budget generator 124 can also generate purchase orders based on the aggregate part counts. The project timeline/budget generator 124 can generate a project timeline by dividing the construction plan into a series of steps. The project timeline/budget generator 124 can prepare the project timeline and a corresponding dependency tree for construction activities.

The project timeline/budget generator 124 can transmit a completed building plan to a financial pro forma generator 126. In a tenth phase, the financial pro forma generator 126 can combine the completed building plan and the developer objectives 102 to produce a combined standardized projected balance sheet, income statement, and cash flow statement for the building. The financial pro forma generator 126 may prompt the user regarding input for items such as marketing timelines, special tax statuses, and cost and pricing forecasts for operations. The construction plan generator 120 can transmit construction plan information to a compliance paperwork generator 128.

In an eleventh phase, the compliance paperwork generator 128 can automatically fill jurisdiction-specific forms and generate specific documentation regulators may require for building approval. For some items, the compliance paperwork generator 128 may prompt the user to fill in certain form fields such as for administrative or non-construction-related areas. In a twelfth phase, the compliance paperwork generator 128 can automatically submit completed compliance paperwork 129 to the relevant authorities (and to a general contractor 130, as appropriate). The compliance paperwork generator 128 can enable the relevant authorities to review an entire set of construction documents for conformity to local regulation, in a consistent format, which can enable faster review as compared to prior approaches. In some cases, some jurisdictions can interface with the system 100 in an automated fashion such that outputs of the system with respect to compliance paperwork are automatically processed by one or more systems of a jurisdiction. In general, consistent, predictable and robust output for compliance paperwork generated by the compliance paperwork generator can streamline approval processes, which can reduce time and resources as compared to prior approaches. With prior approaches, local government workers may spend substantially longer reviewing inconsistent or incomplete paperwork produced by prior manual approaches, resulting in longer reviews and a larger number of review iterations between authorities and developer personnel before approval is granted. As another example, in some implementations, officials who interface with the system can provide feedback which the system can address in real-time, with the system either integrating the feedback automatically (assuming integrating the feedback does not conflict with previously imposed constraints) or pass back to the developer for approval. As an example, a planning official may provide feedback indicating that a certain parking lot included in a plan should have four fire hydrants instead of two, and the system can automatically add two additional fire hydrants to appropriate plan documents.

In a thirteenth phase, the general contractor 130 can receive construction plan information, completed building plan information, and compliance approvals. The general contractor 130 can enlist appropriate labor resources (e.g., labor providers that may be found in a labor providers database 132 (which can include subcontractors 134)). As another example, the labor providers database 132 can provide information about labor providers with capabilities and capacity (availability) to build the designed outputs for the selected building. Labor providers for which information in the labor providers database 132 is stored can include on-site human labor, prefab factory labor, and/or robotic labor. The general contractor 130 can transmit purchase orders to respective suppliers. The general contractor can proceed to manage construction of the building (e.g., a building 136). The general contractor 130 can receive and use consistent and robust design information created from design components of the system 100, which can result in higher construction quality, fewer change orders, fewer coordination issues during construction, and faster construction time, as compared to prior approaches. With prior approaches, the general contractor and subcontractors generally receive various types of drawings created by different designers which may collectively include various inconsistencies, which add time and resources during resolution.

FIG. 4 is a flow diagram for an example process 400 for using artificial intelligence in building construction. The example process 400 may be performed by various systems, including the system 100 of FIG. 1.

At 402, a site selector AI engine receives developer objectives for a building. For example, the site selector 104 can receive the developer objectives 102.

At 404, the site selector AI engine automatically evaluates a geospatial database to identify candidate building sites that have criteria that meet constraints specified or implied in the developer objectives. For example, the site selector 104 can automatically evaluate the geospatial data database 106.

At 406, the site selector AI engine automatically provides geographic and other information for the candidate building sites and the developer objectives to a site compliance analyzer AI engine. For example, the site selector 104 can provide geographic and other information for identified candidate building sites and the developer objectives to the site compliance analyzer 108.

At 408, the site compliance analyzer AI engine automatically evaluates, for each candidate building site, the developer objectives and legal codes and other rules of a jurisdiction application to a location of the candidate building site to filter the candidate building sites to include candidate building sites that comply with the legal codes and other rules. For example, the site compliance analyzer 108 filter the candidate building sites based on candidate building site compliance to information in the legal codes database 110.

At 410, the site compliance analyzer AI engine provides, to a masterplan generator AI engine, the developer objectives and, for each remaining candidate building site, candidate building site information for the candidate building site including constraints required by the legal codes and other rules applicable to the candidate building site. For example, the site compliance analyzer 108 can provide constraints and candidate building site information for remaining candidate building sites to the masterplan generator 112.

At 412, the masterplan generator AI engine automatically generates at least one candidate masterplan for each candidate building site. For example, the masterplan generator 112 can generate candidate masterplans based on received constraints and candidate building site information for remaining candidate building sites.

At 414, the masterplan generator AI engine provides each candidate masterplan to a set of design AI engines. For example, the masterplan generator 112 can provide candidate masterplan information to the aesthetic designer 114 and the schematic designer 116.

At 416, different designs automatically generated by different design AI engines are included, for each candidate masterplan, into a combined candidate plan. The aesthetic generator AI engine can automatically generate, for each candidate masterplan, at least one aesthetic plan. The aesthetic generator AI engine can automatically provides aesthetic plans to the schematic generator AI engine. The schematic generator AI engine can automatically generate schematic drawings for each candidate masterplan, based on received aesthetic plans and the candidate masterplan. Collectively, the different design AI engines can generate hundreds of designs for a candidate masterplan, from single blocks to entire neighborhoods.

At 418, a compliance analyzer AI engine automatically evaluates each combined candidate plan to automatically identify compliant candidate plans that comply with legal codes and other rules applicable to a given combined candidate plan. For example, the plan compliance analyzer 118 can automatically identify compliant candidate plans. Compliant candidate plans can be ranked by the system 100 based on various factors, such as level of compliance, financials, sustainability, and/or other factors.

At 420, a selection of a compliant candidate plan can be received as a selected building plan. For example, the system 100 can receive information indicating user selection of a particular compliant candidate plan.

At 422, plan information for the selected building plan is provided to a set of building construction phase AI engines. The set of building construction phase AI engines can include a construction plan generator AI engine (e.g., the construction plan generator 120), a project timeline generator AI engine (e.g., the project timeline/budget generator 124), and a compliance application generator AI engine (e.g., the compliance paperwork generator 128).

The construction plan generator AI engine can automatically generate a detailed construction plan for the selected building plan. The construction plan generator AI engine can automatically provide the detailed construction plan to the project timeline generator AI engine, a purchase order generator, the compliance application generator AI engine, and a general contractor. The purchase order generator can automatically generate purchase orders for parts for the selected building plan based on aggregate part counts generated from the detailed construction plan. The project timeline generator AI engine can automatically generate, from the detailed construction plan, a project timeline and a construction project task dependency graph for the selected building plan.

The compliance application generator AI engine can automatically generate completed compliance forms specific to a jurisdiction corresponding to the selected building plan and automatically provide the completed compliance forms to an appropriate entity in the jurisdiction corresponding to the selected building plan. An approval engine of the system 100 can receive construction approval for the selected building plan from the appropriate entity and provide construction approval information for the selected building plan to the general contractor.

Combined plan information for the selected building plan can be provided to a financial model generator AI engine. The financial model generator AI engine can automatically generate, based on combined plan information for the selected building plan, a financial model for the selected building plan that includes a standardized projected balance sheet, a projected income statement, and a projected cash flow statement.

In some implementations and for some candidate plans, the compliance analyzer AI engine identifies at least one non-compliant combined candidate plan. For example, the compliance analyzer AI engine (e.g., the plan compliance analyzer 118) can automatically identify a first non-compliant candidate plan that can be modified to become compliant by including one or more new constraints. The compliance analyzer AI engine can automatically provide the one or more new constraints to at least one of the masterplan generator AI engine or one or more design AI engines for a next AI iteration for modifying non-compliant combined candidate plan to be compliant. Respective AI engines can perform multiple iterations until a compliant combined candidate plan is generated and selected.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine readable storage device, a machine readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

training a site selector artificial intelligence (AI) software engine of a multi-modal AI platform to automatically identify candidate building sites based on training developer objectives;

training a site compliance analyzer AI software engine of the multi-modal AI platform to automatically determine whether implementing the training developer objectives at training candidate parcels would comply with regulations applicable to the training candidate parcels;

training a masterplan generator AI software engine of the multi-modal AI platform to automatically generate candidate masterplans for training candidate sites based on training regulation data applicable to the training candidate sites and training developer objectives;

training a compliance analyzer AI software engine of the multi-modal AI platform to automatically determine whether a set of training combined candidate plans that include training masterplans and training design plans comply with training regulations and training construction rules applicable to the training combined candidate plans;

receiving, by the site selector artificial intelligence (AI) software engine, developer objectives for a building;

automatically evaluating, by the site selector AI software engine, a geospatial database to identify candidate building sites that have criteria that meet constraints specified or implied in the developer objectives;

providing, by the site selector AI software engine, geographic and other information for the candidate building sites and the developer objectives to the site compliance analyzer AI software engine;

automatically evaluating, by the site compliance analyzer AI software engine and for each candidate building site, the developer objectives and legal codes and other rules of a jurisdiction application to a location of the candidate building site to filter the candidate building sites to include candidate building sites that comply with the legal codes and other rules;

providing, by the site compliance analyzer AI software engine and to the masterplan generator AI software engine, the developer objectives and, for each remaining candidate building site, candidate building site information for the candidate building site including constraints required by the legal codes and other rules applicable to the candidate building site;

automatically generating, by the masterplan generator AI software engine, at least one candidate masterplan for each candidate building site;

providing, by the masterplan generator AI software engine, each candidate masterplan to a set of design AI software engines;

combining, for each respective candidate masterplan, into a combined candidate plan, the respective candidate masterplan and different designs automatically generated by different design AI engines;

analyzing, by the compliance analyzer AI software engine, each combined candidate plan to automatically identify compliant candidate plans that comply with legal codes and other rules applicable to a given combined candidate plan;

receiving, as a selected building plan, a selection of a compliant candidate plan; and providing plan information for the selected building plan to a set of building construction phase AI software engines.

2. The computer-implemented method of claim 1, wherein the set of design AI software engines includes an aesthetic generator AI software engine and a schematic generator AI software engine.

3. The computer-implemented method of claim 2, wherein the aesthetic generator AI engine is trained to automatically generate, for each candidate masterplan, at least one aesthetic plan.

4. The computer-implemented method of claim 3, wherein the aesthetic generator AI software engine automatically provides aesthetic plans to the schematic generator AI software engine.

5. The computer-implemented method of claim 4, wherein the schematic generator AI software engine automatically generates schematic drawings for each candidate masterplan, based on received aesthetic plans and the candidate masterplan.

6. The computer-implemented method of claim 1, wherein the set of building construction phase AI software engines include a construction plan generator AI software engine, a project timeline generator AI software engine, and a compliance application generator AI software engine.

7. The computer-implemented method of claim 6, wherein the construction plan generator AI software engine is trained to automatically generate a detailed construction plan for the selected building plan.

8. The computer-implemented method of claim 7, wherein the construction plan generator AI software engine automatically provides the detailed construction plan to the project timeline generator AI software engine, a purchase order generator, the compliance application generator AI software engine, and a general contractor.

9. The computer-implemented method of claim 8, wherein the purchase order generator automatically generates purchase orders for parts for the selected building plan based on aggregate part counts generated from the detailed construction plan.

10. The computer-implemented method of claim 8, wherein the project timeline generator AI software engine automatically generates, from the detailed construction plan, a project timeline and a construction project task dependency graph for the selected building plan.

11. The computer-implemented method of claim 8, wherein:
the compliance application generator AI software engine automatically generates completed compliance forms specific to a jurisdiction corresponding to the selected building plan;
the compliance application generator AI software engine automatically provides the completed compliance forms to an appropriate entity in the jurisdiction corresponding to the selected building plan;
an approval engine receives construction approval for the selected building plan from the appropriate entity; and
the approval engine automatically provides construction approval information for the selected building plan to the general contractor.

12. The computer-implemented method of claim 1, wherein:
combined plan information for the selected building plan is provided to a financial model generator AI software engine; and
the financial model generator AI software engine automatically generates, based on combined plan information for the selected building plan, a financial model for the selected building plan that includes a standardized projected balance sheet, a projected income statement, and a projected cash flow statement.

13. The computer-implemented method of claim 1, wherein:
the compliance analyzer AI software engine identifies at least one non-compliant combined candidate plan;
the compliance analyzer AI software engine automatically identifies a first non-compliant candidate plan that can be modified to become compliant by including one or more new constraints; and
the compliance analyzer AI software engine automatically provides the one or more new constraints to at least one of the masterplan generator AI software engine or one or more design AI software engines for a next AI iteration for modifying non-compliant combined candidate plan to be compliant.

14. A system comprising:
one or more computers comprising one or more storage devices storing:
a trained site selector AI software engine;
a geospatial database;
a trained site compliance analyzer AI software engine;
a trained masterplan generator AI software engine;
a set of trained design AI software engines;
a trained compliance analyzer AI software engine; and
a set of trained building construction phase AI software engines;
wherein the trained site selector AI software engine is trained to:
automatically evaluate the geospatial database to identify candidate building sites that have criteria that meet constraints specified or implied in developer objectives; and
provide geographic and other information for the candidate building sites and the developer objectives to the trained site compliance analyzer AI software engine; and
wherein the trained site compliance analyzer AI software engine is trained to:
automatically evaluate for each candidate building site, the developer objectives and legal codes and other rules of a jurisdiction application to a location of the candidate building site to filter the candidate building sites to include candidate building sites that comply with the legal codes and other rules; and
provide to the trained masterplan generator AI engine, the developer objectives and, for each remaining candidate building site, candidate building site information for the candidate building site including constraints required by the legal codes and other rules applicable to the candidate building site; and
wherein the trained masterplan generator AI software engine is trained to:
automatically generate at least one candidate masterplan for each candidate building site;
provide each candidate masterplan to the set of design AI software engines; and
combine, for each respective candidate masterplan, into a combined candidate plan, the respective candidate masterplan and different designs automatically generated by different design AI software engines; and
wherein the trained compliance analyzer AI software engine is trained to:
analyze each combined candidate plan to automatically identify compliant candidate plans that comply with legal codes and other rules applicable to a given combined candidate plan; and receive as a selected building plan, a selection of a compliant candidate plan; and provide plan information for the selected building plan to the set of building construction phase AI software engines.

15. The system of claim 14, wherein the set of design AI software engines includes an aesthetic generator AI software engine and a schematic generator AI software engine.

16. The system of claim 15, wherein the aesthetic generator AI software engine is trained to automatically to generate, for each candidate masterplan, at least one aesthetic plan.

17. The system of claim 16, wherein the aesthetic generator AI software engine is trained to automatically provide aesthetic plans to the schematic generator AI software engine.

18. The system of claim 17, wherein the schematic generator AI software engine is trained to automatically generate schematic drawings for each candidate masterplan, based on received aesthetic plans and the candidate masterplan.

19. The system of claim 14, wherein the set of trained building construction phase AI software engines include a construction plan generator AI software engine, a project timeline generator AI software engine, and a compliance application generator AI software engine.

20. The system of claim 14, wherein the trained construction plan generator AI software engine is trained to automatically generate a detailed construction plan for the selected building plan.

* * * * *